US012037827B2

(12) United States Patent
Irgang et al.

(10) Patent No.: US 12,037,827 B2
(45) Date of Patent: Jul. 16, 2024

(54) GUIDE APPARATUS FOR GUIDING A FURNITURE PART

(71) Applicant: Julius Blum GmbH, Hoechst (AT)

(72) Inventors: Markus Irgang, Altach (AT); Guenter Schwarzmann, Dornbirn (AT); Bernd Koenig, Hoechst (AT); Markus Alge, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 86 days.

(21) Appl. No.: 17/840,998

(22) Filed: Jun. 15, 2022

(65) Prior Publication Data

US 2022/0307304 A1 Sep. 29, 2022

Related U.S. Application Data

(63) Continuation of application No. PCT/AT2020/060450, filed on Dec. 11, 2020.

(30) Foreign Application Priority Data

Dec. 19, 2019 (AT) .................................. 51125/2019

(51) Int. Cl.

| | |
|---|---|
| ***E05D 15/00*** | (2006.01) |
| ***E05D 15/06*** | (2006.01) |
| ***E05D 15/58*** | (2006.01) |

(52) U.S. Cl.

CPC ........... *E05D 15/063* (2013.01); *E05D 15/58* (2013.01); *E05Y 2201/638* (2013.01); *E05Y 2201/692* (2013.01); *E05Y 2900/212* (2013.01)

(58) Field of Classification Search

CPC ..... E05D 15/00; E05D 15/1005; E05D 15/28; E05D 15/58; E05D 15/0608;

(Continued)

(56) References Cited

U.S. PATENT DOCUMENTS 3,049,083 A * 8/1962 Potter ................... B61B 10/022 105/156
4,457,046 A * 7/1984 Vater ..................... E05D 15/063 16/98

(Continued)

FOREIGN PATENT DOCUMENTS

| | | |
|---|---|---|
| AT | 519120 | 4/2018 |
| AT | 521139 | 11/2019 |

(Continued)

OTHER PUBLICATIONS

International Search Report issued Feb. 19, 2021 in International (PCT) Application No. PCT/AT2020/060450.

*Primary Examiner* — Chuck Y Mah
(74) *Attorney, Agent, or Firm* — Wenderoth, Lind & Ponack, L.L.P.

(57) ABSTRACT

A guide apparatus for guiding a furniture part, in particular a sliding door or folding-sliding-door, including a guide rail and a chassis which can be connected to the furniture part and which can travel on the guide rail. The chassis has a load-bearing roller, mounted about a first rotation axis, for supporting the weight of the furniture part and a supporting roller for laterally guiding the furniture part. The supporting roller is rotatably mounted about a second rotation axis which is oriented transverse to the first rotation axis, and a support apparatus is separate from the at least one supporting roller, and is designed to relieve the supporting roller in an end position of the at least one guide rail against a transverse force acting laterally, i.e. substantially parallel to the first rotation axis.

26 Claims, 13 Drawing Sheets

(58) Field of Classification Search

CPC ............ E05D 15/0621; E05D 15/0626; E05D 15/264; E05D 15/06; E05D 15/063; E05D 15/0643; E05D 15/0647; E05D 15/165; E05D 15/0652; E05D 15/0653; E05D 15/26; E05D 15/262; E05Y 2201/638; E05Y 2201/64; E05Y 2201/688; E05Y 2201/692; E05Y 2201/708; E05Y 2201/612; E05Y 2201/614; E05Y 2900/531; E05Y 2900/532; E05Y 2900/20; E05Y 2900/131; E05Y 2900/132; E05Y 2900/142; E05Y 2900/212; E06B 3/50; E06B 3/485; E06B 9/36; E06B 3/42; E06B 3/46; E06B 3/4609; E06B 3/4636; B60J 5/06; B60J 5/062; B60J 5/047; B60J 5/12; B60J 5/04; A47H 2023/025; A47H 1/04; A47H 15/00; A47H 15/02; A47H 15/04

See application file for complete search history.

(56) References Cited

U.S. PATENT DOCUMENTS 4,642,844 A * 2/1987 Johnston ............... E05D 15/063 16/98
4,852,628 A * 8/1989 Klein ...................... E05D 15/26 160/199
5,131,449 A 7/1992 Winn et al.
6,094,866 A * 8/2000 Busnelli .............. E05D 15/1065 49/211
9,032,589 B2 * 5/2015 Pelekanos ............... E05D 15/26 16/98
11,008,791 B2 5/2021 Rupp et al.
11,136,804 B2 10/2021 Rupp et al.
11,274,482 B2 3/2022 Rupp et al.
2002/0170234 A1 * 11/2002 Salice ................... E05D 15/264 49/453
2007/0272370 A1 * 11/2007 Knutson ............... E05F 15/605 160/199
2009/0309324 A1 * 12/2009 Comunello ......... E05D 15/0617 280/79.7
2010/0038041 A1 * 2/2010 Liao .................... E05D 15/0613 160/196.1
2014/0150208 A1 * 6/2014 Haab ....................... E05D 13/00 16/86.2
2016/0024826 A1 * 1/2016 Smith ..................... E05D 15/26 160/197
2016/0312521 A1 * 10/2016 Berger .................... E05D 15/30
2017/0260789 A1 * 9/2017 Gabl ....................... E06B 3/509
2019/0284859 A1 9/2019 Rupp et al.
2019/0301216 A1 10/2019 Rupp et al.
2019/0301218 A1 10/2019 Rupp et al.
2021/0246699 A1 8/2021 Goetz
2021/0246700 A1 8/2021 Hoffmann

FOREIGN PATENT DOCUMENTS

| | | | |
|---|---|---|---|
| AT | 521260 | | 12/2019 |
| CH | 690 504 | | 9/2000 |
| CN | 108691471 | | 10/2018 |
| CN | 110199079 | | 9/2019 |
| CN | 110199080 | | 9/2019 |
| DE | 3107999 | A1 * | 9/1982 |
| EP | 0 433 726 | | 6/1991 |
| EP | 1 394 349 | | 3/2004 |
| FR | 2 896 008 | | 7/2007 |
| JP | 57-20490 | | 7/1955 |
| JP | 4-123998 | | 11/1992 |
| JP | 9-144419 | | 6/1997 |
| JP | 2000-177394 | | 6/2000 |
| JP | 2004-190230 | | 7/2004 |
| JP | 2006037624 | A * | 2/2006 |
| JP | 2006-257704 | | 9/2006 |
| JP | 2009-167711 | | 7/2009 |
| JP | 4888070 | B2 * | 2/2012 |
| TW | 201837292 | | 10/2018 |

* cited by examiner

GUIDE APPARATUS FOR GUIDING A FURNITURE PART

BACKGROUND OF THE INVENTION

The invention relates to a guide device for guiding a furniture part, in particular a sliding door or folding sliding door, comprising at least one guide rail and at least one chassis which can be connected to the furniture part and can travel on the at least one guide rail. The at least one chassis has at least one carrying roller mounted about a first axis of rotation for supporting the weight of the furniture part, and at least one supporting roller for laterally guiding the furniture part. The at least one supporting roller is mounted rotatably about a second axis of rotation aligned transverse to the first axis of rotation.

The invention furthermore relates to a piece of furniture with at least one furniture part, in particular a sliding door or folding sliding door, a furniture carcass, and at least one such guide device.

The invention furthermore relates to a method for guiding at least one furniture part, in particular a sliding door or folding sliding door, relative to a furniture carcass by means of at least one such guide device.

Guide devices for furniture parts, in particular sliding doors or folding sliding doors, are already known in the state of the art. There are designs which have only one roller. In this case, this roller assumes the function as carrying roller and as supporting roller. Furthermore, designs are known which have both a carrying roller and a supporting roller.

In the case of normal loads, i.e. conventional opening and/or closing movements, both variants are widely used. However, as soon as the load due to the furniture part no longer acts exclusively in the vertical direction, but also acts laterally, i.e. perpendicular to the sliding direction and to the vertical, the function of the supporting roller becomes increasingly important. This is the case for example in folding sliding doors. In some positions of the doors, a lateral force which is caused by the folded parts of the sliding door with a lateral overhang also acts on the guide device in addition to the vertical load. In the case of such lateral loads, the supporting roller ensures that the guide device does not become wedged or jammed, since it centers the carrying roller in the guide rail.

If a lateral force permanently acts on the supporting rollers, a deformation of the supporting rollers can occur. This has the result that the guide device can no longer move smoothly or a rattling of the supporting rollers occurs. Such a deformation is also called flattening and is caused by a force permanently acting on the supporting rollers while they are not being moved.

SUMMARY OF THE INVENTION

The object of the invention is to improve a guide device to the effect that a flattening of the supporting rollers is prevented or at least reduced. A further object of the invention is to provide a piece of furniture with an improved guide device. A further object of the invention is to provide a method using an improved guide device.

In the case of the guide device according to the invention, at least one support device separate from the at least one supporting roller is provided which is formed to relieve the pressure on the at least one supporting roller in at least one end position of the at least one guide rail against a transverse force acting laterally, i.e. substantially parallel to the first axis of rotation.

By relieving the pressure on the supporting rollers in at least one end position, a permanent loading of the supporting rollers in a position in which the furniture part often stays for a relatively long time is prevented. As a result, a flattening of the at least one supporting roller can be prevented or at least reduced and the lifetime of the guide device can be extended.

The at least one support device has at least a first part and a second part which are movable relative to each other. The first part and the second part are coupled to each other in a first position in order to relieve the pressure on the at least one supporting roller against the transverse force, and the first part and the second part are decoupled from each other at least in a second position.

Through the two-part construction, it can be guaranteed that the pressure on the supporting roller is only relieved in a particular position or in the region of a particular position and it can perform the task for which it was designed unhindered in at least one second position. It is thereby also possible that such a support device can be attached to a guide device subsequently.

One of the at least two parts of the at least one support device can be connected in a movement-coupled manner to the at least one chassis, and/or the other of the at least two parts of the at least one support device can be arranged fixed, preferably is connected to the at least one guide rail.

Such a design can make a more stable construction possible, as only one part of the support device can be moved, while the second part can be arranged fixed. The likelihood of damage to the components can thus be reduced, as the component which can be arranged fixed has no room to move.

The at least one support device can have at least one ramp, and preferably the at least one ramp is aligned substantially parallel to the second axis of rotation of the at least one supporting roller, and/or the at least one ramp is aligned at an angle to a longitudinal direction of the at least one guide rail.

By parallel is meant here that the axis of rotation and the plane of the ramp do not have a common point of intersection. The ramp is at an angle to a longitudinal direction of the guide rail when it forms an acute angle with the latter.

The ramp can serve to guide the support device and thus make the process for relieving the pressure on the at least one supporting roller in an end position of the guide rail easier.

At least one carrier can be aligned substantially parallel to the second axis of rotation, on which the furniture part can be mounted, preferably via at least one hinge, and/or at least two guide rails are provided which are arranged substantially transverse to each other.

A carrier, which is aligned substantially parallel to the second axis of rotation, makes it possible to connect two guide devices in a movement-coupled manner. As a result, a better and more stable guiding of the furniture part can be achieved. Above all, in the case of lateral loads, a tilting of the furniture part can thereby be prevented. In addition, a carrier can act as a connection means between the individual rollers and can thus simultaneously act as a chassis.

It is also possible for the furniture part to be mounted on two guide rails standing transverse to each other. A movement around the corner is thereby possible. In the case of a folding sliding door, it is possible for the folding sliding door to always be located outside the space between the two guide rails during a corresponding movement. In general, the freedom of movement of the furniture part can be increased through the use of two guide rails.

The use of a second guide rail can make it possible to move the furniture part in a direction transverse to the first guide rail; as a result the lateral loading of the first guide rail can increase. The relieving of the pressure on the supporting roller in end positions thereby becomes all the more important in order to prevent a flattening of the supporting rollers.

The at least one support device has at least one rolling body, preferably the at least one rolling body is mounted rotatably about a third axis of rotation aligned parallel to the second axis of rotation of the at least one supporting roller, and/or is mounted on the at least one chassis via at least one needle roller bearing, and/or consists of steel at least in regions.

The use of a rolling body as part of the support device can improve the relieving of the pressure on the supporting roller in an end position of the guide rail. In an end position, a coupling-in can be made easier through the round shape of the rolling body.

In order to guarantee a pressure relief against a lateral load, it has proved to be advantageous if the rolling bearings are mounted rotatably about an axis of rotation parallel to the second axis of rotation. Such a positioning makes an optimum relieving of the pressure on the supporting roller possible, as the rolling bearings can be aligned parallel to the at least one supporting roller.

The use of a needle roller bearing can make a good mounting of the rolling body possible. At the same time a space-saving construction of the rolling bodies can be realized thereby.

In order to prevent wear and/or a flattening of the rolling body, steel can be used for the rolling body at least in regions. However, other hard, non-brittle materials are also conceivable. The deformation of such materials is negligible even in the case of lengthy loads. As a result, such materials are ideal for a permanent relieving of the pressure on the supporting rollers.

The at least one support device can have at least one sliding body.

A sliding body can also be used in order to guarantee the relieving of the pressure on the supporting rollers in an end position of the guide rail. Such a sliding body can be used as an alternative or complement to a rolling body. The sliding body can serve the support device as a guide during the pressure-relieving process, in order to gradually restrict the room available to the guide device to move in the region of the end position and to gradually reduce the loading of the supporting rollers in this region until the coupled-in position is reached.

A contact between the at least one supporting roller and the at least one guide rail in the at least one end position of the at least one guide rail can be removed by the at least one support device.

A flattening of the supporting roller can thereby be ruled out, as a lateral load no longer acts on the supporting roller in this end position.

The at least one guide rail consists of aluminum at least in regions, and/or a lateral surface of the at least one supporting roller consists of plastic, and/or the at least one support device has at least one steel part which can be arranged fixed.

Because of the low weight and the relatively high strength and stability of aluminum it can be advantageous to make the guide rail out of aluminum at least in regions. For a good and quiet rolling behavior of the supporting roller, it can be advantageous if it consists of plastic. It is also conceivable for only the outer shell of the supporting roller to consist of plastic. For the support device, it can be advantageous if at least one part of the support device which can be arranged fixed consists of steel, in order to prevent wear and deformation of the support device. A consistent relieving of the pressure on the supporting roller can thereby be guaranteed.

It can be provided that one of the at least two parts of the at least one support device has a U-shaped profile which can be detachably coupled to the at least one rolling body of the second of the at least two parts of the at least one support device.

By combining a U-shaped profile with a rolling body, the guiding of the furniture part during the pressure-relieving process can be optimized. The U-shaped profile serves to catch the rolling body and thereby to initiate the pressure-relieving process in the end region of the guide rail and subsequently to relieve the pressure on the supporting roller in the coupled state. Through the U-shaped profile, a pressure relief in the case of a lateral load is possible irrespective of the direction.

According to a preferred embodiment of the guide device, the at least one support device has at least one pin, and preferably the at least one pin is arranged substantially parallel to a longitudinal direction of the at least one guide rail, and/or at least one second pin is provided, and the two pins are spaced apart from each other, preferably in a transverse direction of the at least one guide rail, and/or the at least one pin has a ramp in an end region, and/or the at least one pin is arranged in a preferably corresponding recess of a profiled section of the at least one guide rail, and/or the at least one pin substantially consists of steel, and/or the at least one pin is arranged in an end region of the at least one guide rail.

The piece of furniture according to the invention consists of at least one furniture part, in particular a sliding door or folding sliding door, a furniture carcass, and at least one guide device according to the invention. Preferably, the piece of furniture has at least one interior which can be covered by the at least one furniture part at least in regions and in which kitchen furniture and/or kitchen appliances can be arranged and/or has at least one cavity extending in a depth direction of the piece of furniture for at least partially receiving the at least one furniture part.

Such an arrangement makes it possible to utilize the interior of the piece of furniture without restriction. By partially stowing the furniture parts in the cavities, the impression is given that the interior of the piece of furniture is part of the room. This impression is also reinforced by the fact that no additional guide is necessary in the bottom region of the furniture part. If the interior is no longer needed, then the piece of furniture can be closed and the interior is visually separated from the rest of the room.

The method according to the invention for guiding at least one furniture part, in particular a sliding door or folding sliding door, relative to a furniture carcass by means of at least one guide device according to the invention has the following method steps:

- the weight of the at least one furniture part is supported by the at least one carrying roller of the at least one chassis,
- the furniture part is laterally guided by the at least one supporting roller during a movement of the furniture part along the at least one guide rail, and
- the pressure on the at least one supporting roller is relieved by the at least one support device in at least one end position of the at least one guide rail against a transverse force acting laterally, i.e. substantially parallel to the first axis of rotation of the at least one carrying roller.

A contact between the at least one supporting roller and the at least one guide rail in the at least one end position of the at least one guide rail can be removed by the at least one support device.

BRIEF DESCRIPTION OF THE DRAWINGS

Further details and advantages of the invention are explained in more detail below by means of the description of the figures with reference to the drawings. There are shown in.

DETAILED DESCRIPTION OF THE INVENTION

Figure 1A:
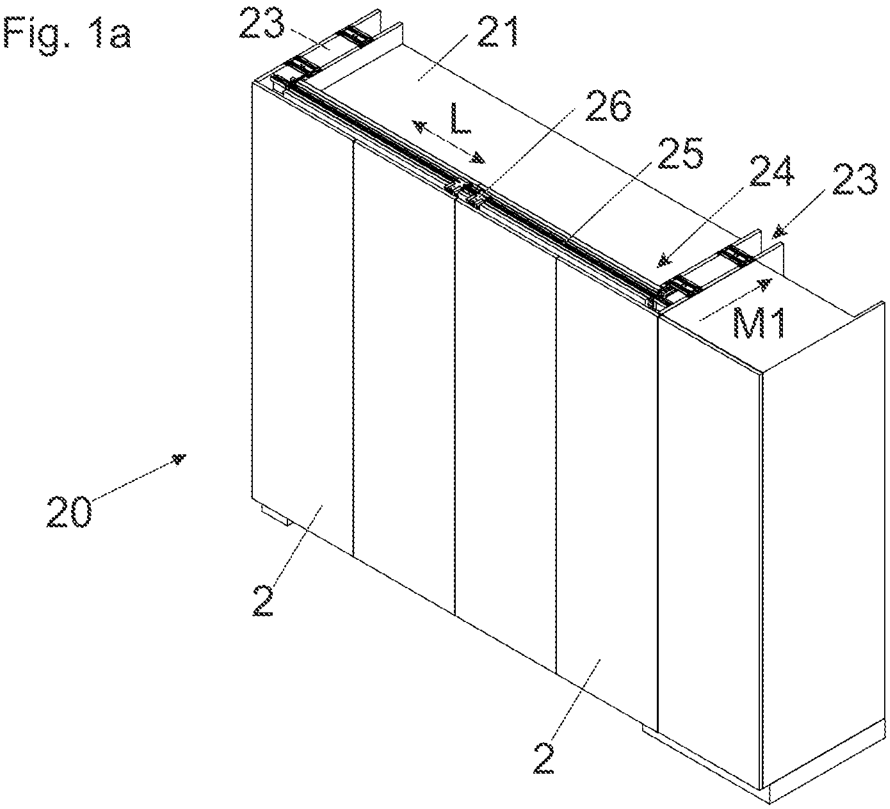
FIGS. 1*a*, 1*b* are perspective views of a piece of furniture with a furniture carcass and furniture parts movable relative thereto.

FIG. 1*a* shows a perspective view of a piece of furniture 20 with a furniture carcass 21 and panel-type furniture parts 2 movable relative thereto, which can also be seen as a folding sliding door. The furniture parts 2 consist of individual panel-type parts which are connected to each other by hinge fittings 28 (not depicted in this figure).

Through a guide system 24 the furniture parts 2 are mounted on the transverse rail 25 movable between a first position in which the furniture parts 2 are aligned substantially coplanar to each other and a second position in which the furniture parts 2 are aligned substantially parallel to each other. In the parallel position the furniture parts 2 can be pushed in a first movement direction M1 into a side cavity 23 which acts as receiving compartment.

Furthermore, the functional principle is described with reference to one furniture part 2, wherein the designs apply analogously to the second furniture part 2. The guide system 24 comprises a transverse rail 25 with a longitudinal direction L, wherein a guide carriage 26 which can be connected to the furniture part 2 is mounted such that it can travel along the transverse rail 24.

Figure 1B:
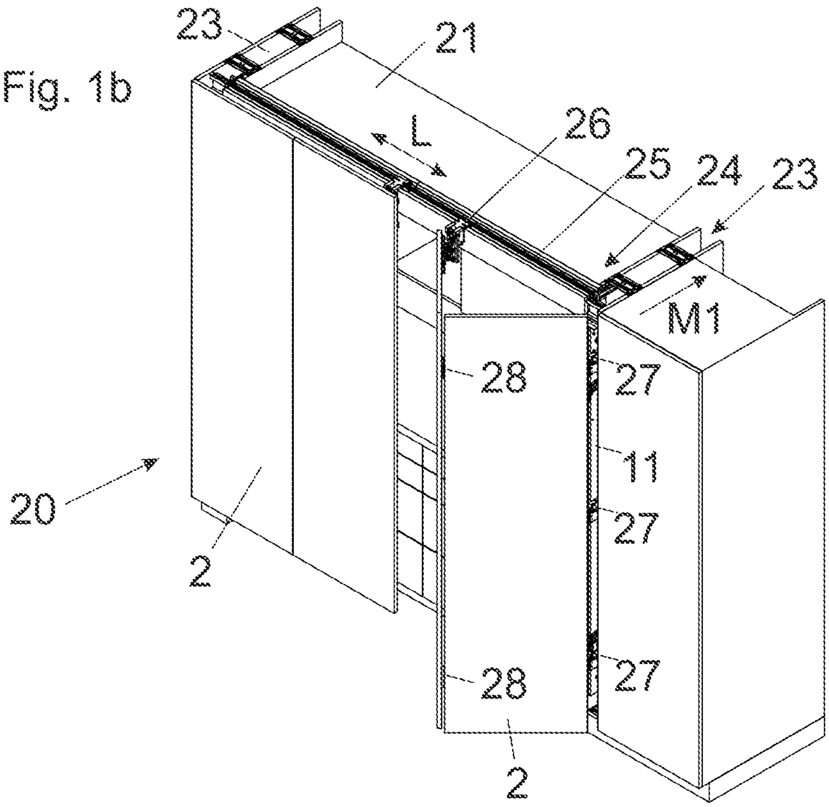

In FIG. 1*b*, one of the two foldable furniture parts 2 has been moved from the coplanar position into an angled position. The hinge fittings 28, which connect the two furniture parts 2 to each other, are now also visible.

The furniture part 2 is mounted rotatably on a carrier 11 via two or more hinges 27. The carrier 11 is mounted on at least one guide rail 3 (not shown in this figure) and can be pushed into the cavity 23 in the depth direction of the furniture carcass 21. The carrier 11 is formed in order that, in this position, it is connected to the transverse rail 25 in the longitudinal direction L and that the guide carriage 26 can be transferred between the transverse rail 25 and the carrier 11. In this position the guide carriage 26 can thus be pushed onto the carrier 11.

The carrier 11 is formed as an elongated post, the length of which corresponds to at least half the height of the furniture parts 2.

Figure 2A:
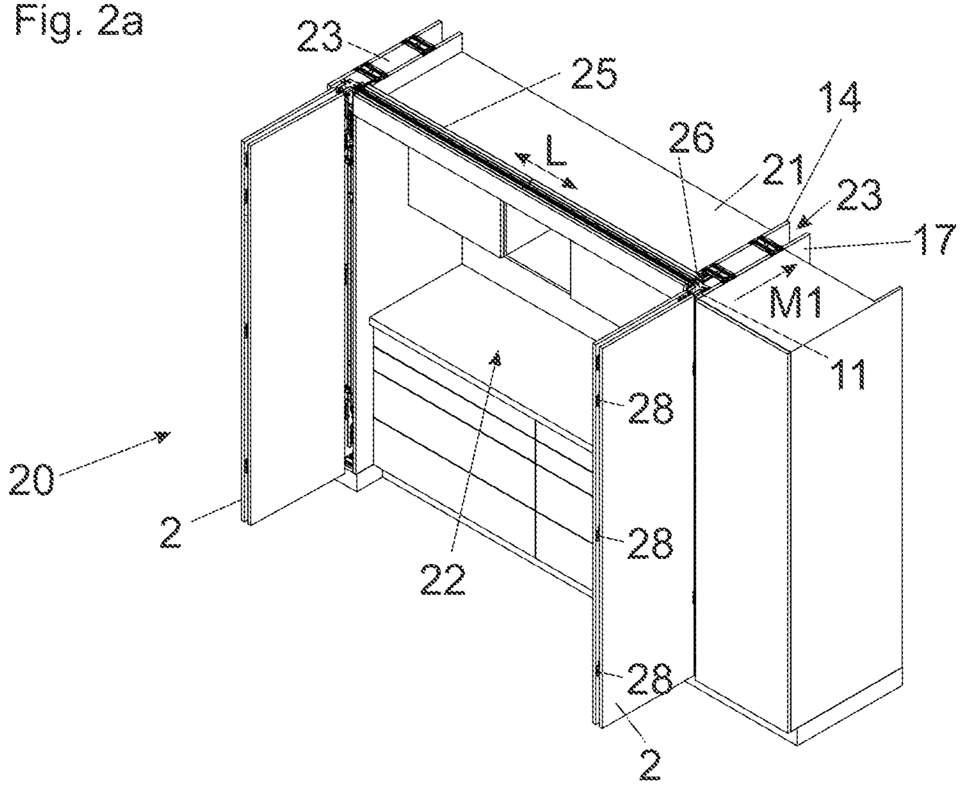
FIGS. 2*a*, 2*b* show the piece of furniture according to FIGS. 1*a*, 1*b* with the furniture parts in further positions relative to each other, FIG. 3 show the piece of furniture without side cover panel.

FIG. 2*a* shows the piece of furniture 20, wherein the two furniture parts 2 are in a parallel position relative to each other. The guide carriage 26 has been transferred onto the carrier 11. The carrier 11 has been unlatched through the pushing-on of the guide carriage 26 and in this state can be pushed into the cavity 23 along the guide rail 3 (not depicted here, see FIG. 3) in the depth direction of the furniture carcass 21.

Figure 2B:
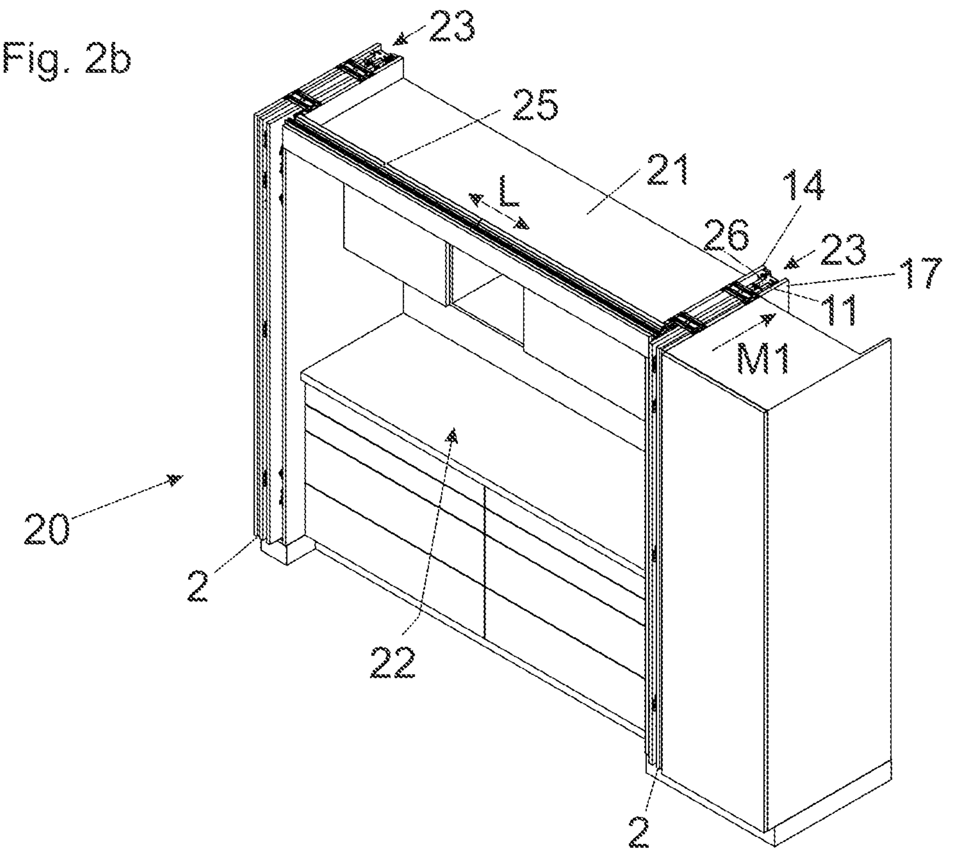

FIG. 2*b* shows the piece of furniture 20 with the furniture parts 2 in a completely pushed-in state. Through the guide system 24 the furniture parts 2 are thus mounted movable starting from a first coplanar position according to FIG. 1*a* and a second parallel position according to FIG. 2*b* in which the furniture parts 2 have been pushed into the cavity 23. The cavity 23 is formed by a side wall 14 of the furniture carcass 21 and an outer wall 17 of the piece of furniture 20 arranged parallel thereto.

In this way the interior 22 of the piece of furniture 20, such as for example a kitchen or a work surface, can be completely covered, with the result that this interior 22 can be separated off from a remaining region of a living room.

Figure 3:
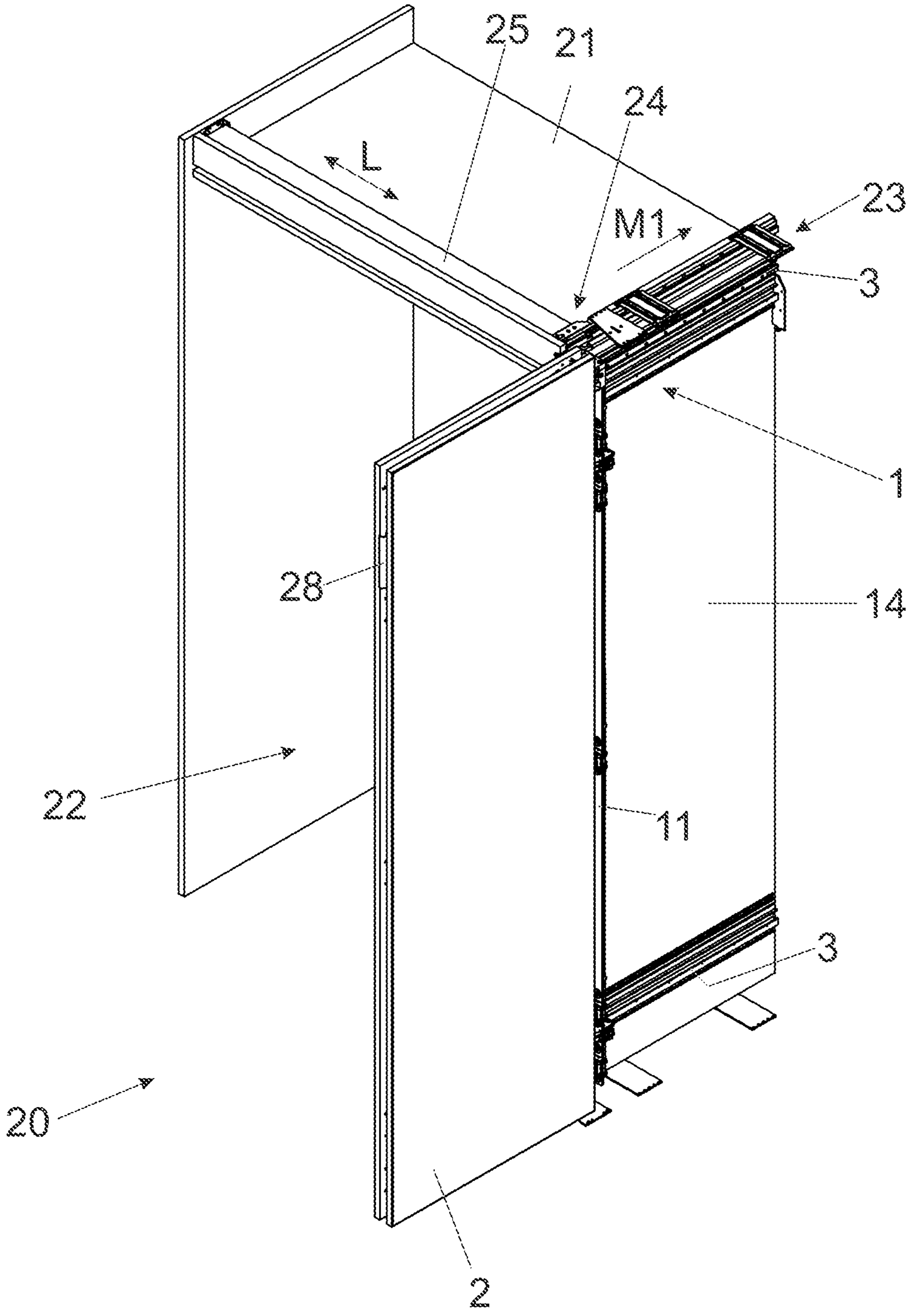

FIG. 3 shows the piece of furniture 20, wherein the outer wall 17 has been removed in order to depict the arrangement of the guide rail 3 in the cavity 23. At least one guide rail 3 for guiding the carrier 11 and thus the furniture part 2 is installed on the side wall 14 of the furniture carcass 21.

Two guide rails 3 can be seen in the figure, which can guarantee a better guiding of the carrier 11. The guide rails 3 are arranged transverse, preferably at right angles, to the transverse rail 25. The further components of the guide device 1 are not visible in this figure and will be dealt with in greater detail in the following figures.

In spite of the guide carriage 26, which supports some of the weight of the furniture part 2, the carrier 11, and thereby the guide device 1, experiences a strong and permanent lateral loading due to the lateral deflection of the furniture part 2 in the closed state. In order to prevent a flattening of the supporting rollers 6 at least in the closed position, a support device 7 according to the invention can be used.

Figure 4A:
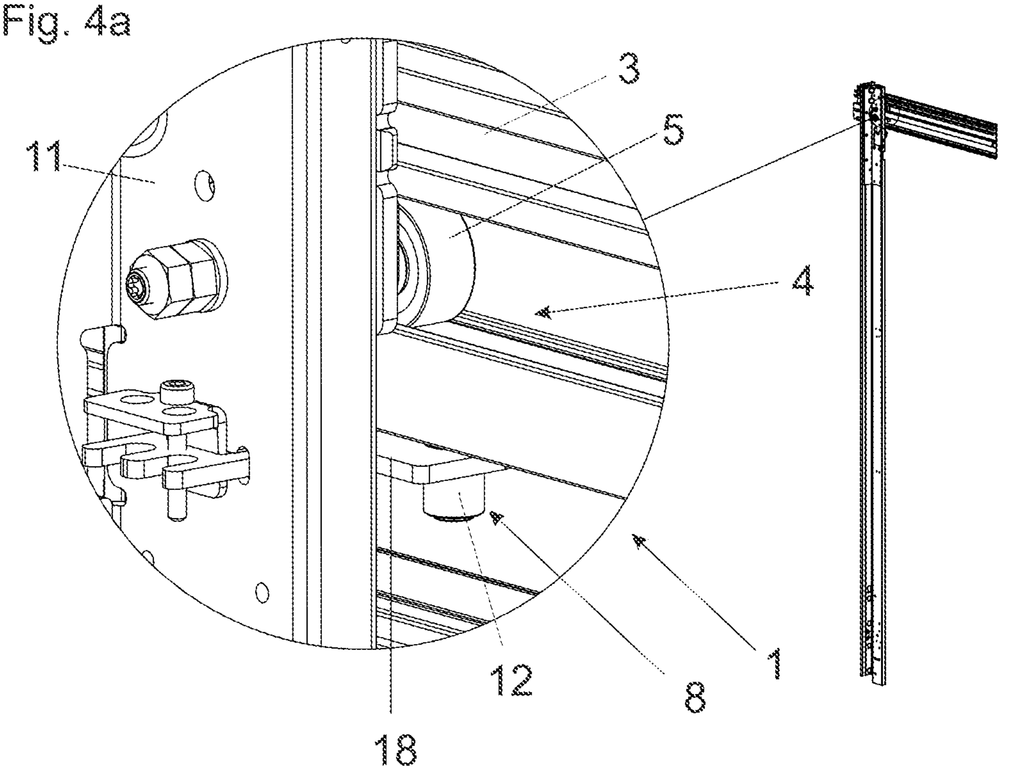
FIGS. 4*a*, 4*b* are two perspective views of an embodiment of the guide device with carrier in a decoupled position.

FIG. 4*a* shows the guide device 1 with carrier 11 in the decoupled state. For a clearer view, the additional depiction of the furniture part 2 and the furniture carcass 21 has been dispensed with. On the right-hand side, the guide device 1 and the carrier 11 are depicted complete in order to illustrate what detail is shown in what perspective. In the detail view the guide device 1 can be seen in the decoupled state.

The carrying roller 5 is arranged movably in the guide rail 3. The supporting roller 6 is concealed in this figure, but is located between the carrying roller 5 and the rolling body 12. The carrying roller 5 is connected to the carrier 11.

The first part 8 of the support device 7, which is connected in a movement-coupled manner to the chassis 4, is formed as a rolling body 12 in this embodiment. The at least one rolling body 12 and the supporting roller 6 concealed in this figure are fastened on the same carriage 18 in this embodiment. The carriage 18 is connected to the carrier 11, whereby the carrier 11 connects the supporting roller 6 and the carrying roller 5 to each other and as a result, simultaneously with the two rollers, functions as a chassis 4.

Figure 4B:
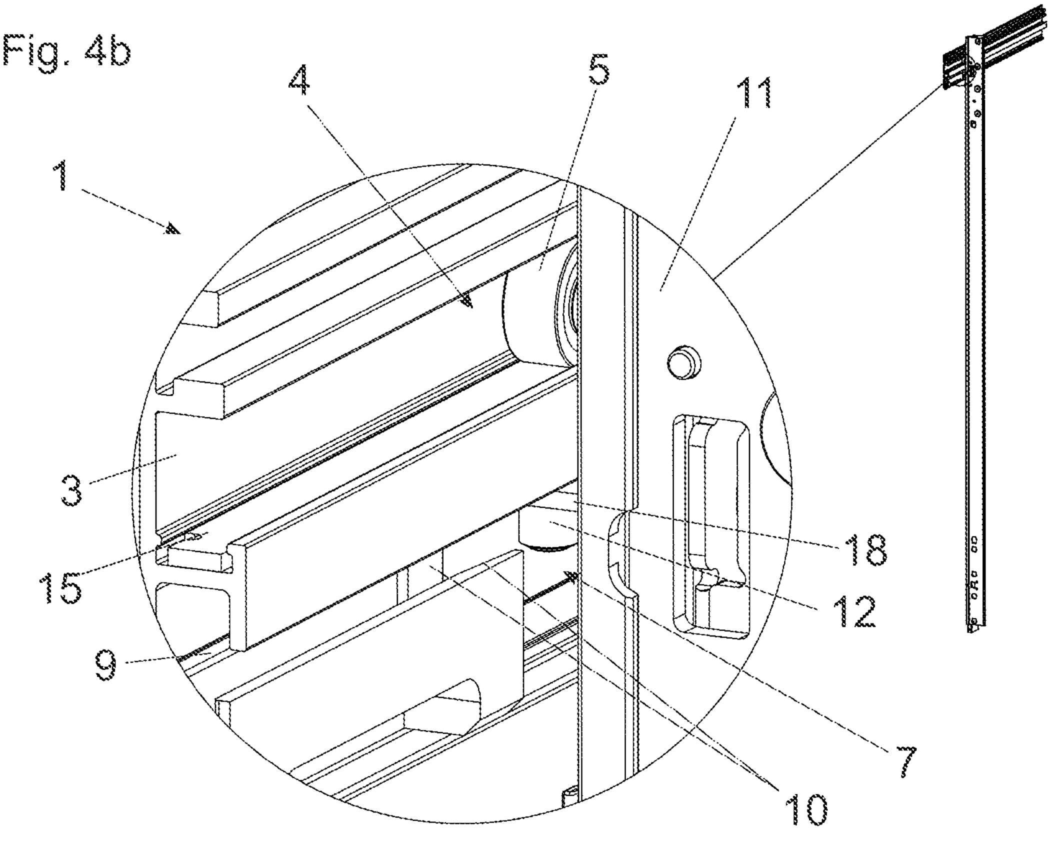

FIG. 4*b* shows the embodiment from FIG. 4*a* in a different perspective. The carrying roller 5 is mounted movably on a support 15 in the guide rail 3. This support 15 serves to slow down, preferably to prevent, the wear of the carrying roller 5. The support 15 can additionally serve to reduce the generation of noise. The supporting roller 6 which is concealed in this figure and is connected to the carrier 11 via the carriage 18 is located under the carrying roller 5. The at least one rolling body 12 is also connected to the carriage 18.

In this embodiment the part 9, which can be arranged fixed, of the support device 7 is formed as a U-shaped profile in which the at least one rolling body 12 can be coupled. The ramps 10 in the region of the U-shaped profile, which are facing the rolling body 12, can make the guiding of the at least one rolling body 12 during the pressure-relieving process easier and guarantee a smooth transition between the decoupled and coupled states.

Figure 5A:
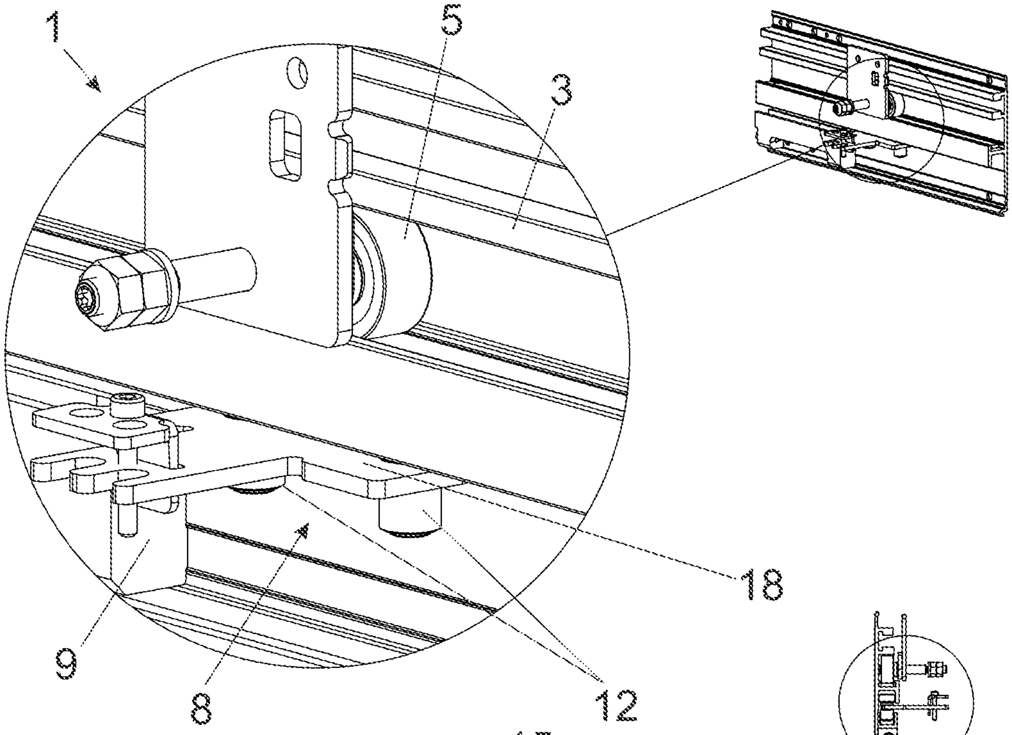
FIG. 5*a* is a perspective view of the embodiment according to FIGS. 4*a*, 4*b* of the guide device without carrier in decoupled position.

FIG. 5*a* shows the guide device 1 from the same perspective as FIG. 4*a*. For a clearer view, the carrier 11 which simultaneously acts as a chassis 4 has been omitted in this figure. The carrying roller 5 is arranged such that it can travel in the guide rail 3. The first part 8, movement-coupled to the chassis 4, of the support device 7 comprises two rolling bodies 12 which are arranged on the carriage 18. Analogously to the two rolling bodies 12, two supporting rollers 6 (which are concealed or can only be seen to some extent in this figure) are arranged on the upper side of the carriage 18.

The dual design of both the supporting rollers 6 and the rolling bodies 12 serves for a stable guiding of the chassis 4, not depicted. The guide device 1 can thereby be prevented from becoming jammed or wedged due to lateral loads and/or loads acting parallel to the direction of travel.

The second part, which can be arranged fixed, of the support device 7 is formed such that both rolling bodies 12 can be received in the U-shaped profile. In the pressure-relieving position a tilting of the carrier 11, not depicted, and an additional loading of the supporting rollers 6 (not visible or visible only to some extent) in the pressure-relieving position can thereby also be prevented.

Figure 5B:
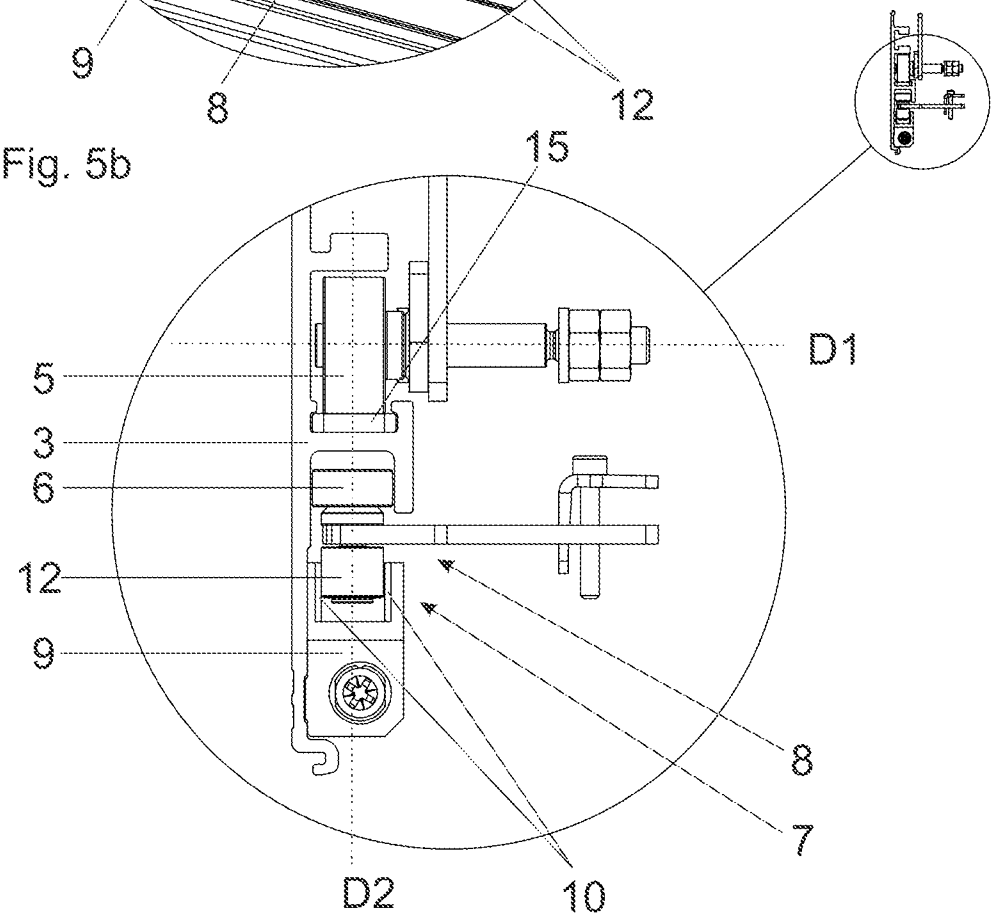
FIG. 5*b* is a side view of the embodiment according to FIGS. 4*a*, 4*b* of the guide device without carrier in decoupled position.

FIG. 5*b* shows the arrangement of FIG. 5*a* in the side view, which in the installed position corresponds to the front view of the piece of furniture 20. The carrying roller 5 mounted about a first axis of rotation D1 is mounted such that it can travel on a support 15 in the guide rail 3. The supporting roller 6 is mounted rotatably about a second axis of rotation D2 aligned transverse to the first axis of rotation D1. The rolling bodies 12 are installed on the same carriage 18 as the supporting rollers 6.

Through this arrangement the movement of the rolling bodies 12 is coupled to the chassis 4, not depicted, by the carriage 18. The carrying roller 5 and the supporting rollers 6 can be connected to a carrier 11 (not depicted), which would simultaneously perform the function of the chassis 4 in this embodiment.

The part 9, which can be arranged fixed, of the support device 7 is formed as a U-shaped profile which has ramps 10 on both sides in the longitudinal direction of the guide rail 3. These ramps 10 can make the receiving of the rolling bodies 12 in the U-shaped profile easier and as a result a fluid transition from a decoupled position into the coupled position can be guaranteed.

Figure 6A:
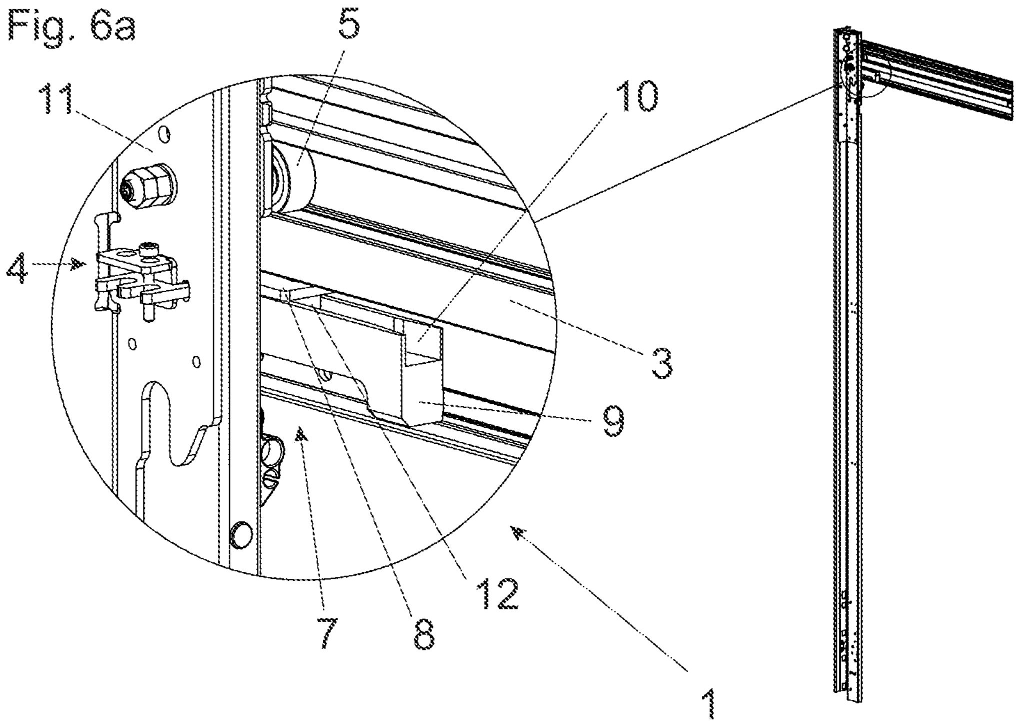
FIG. 6*a* is a perspective view of the embodiment according to FIGS. 4*a*, 4*b* of the guide device with carrier in coupled position.

FIG. 6*a* shows the guide device 1 with carrier 11 in the coupled state. On the right-hand side, the arrangement is represented complete, in order to be able to better map the detail representation.

In the coupled state, the U-shaped profile of the part 9, which can be arranged fixed, of the support device 7 has received the rolling bodies 12 of the part 8, movement-coupled to the chassis 4, of the support device 7 and has thereby relieved the pressure on the supporting rollers 6 (not visible, or concealed, in this figure).

The supporting rollers 6 and the rolling bodies 12 are arranged on the same carriage 18, which is in turn connected to the carrier 11. As the carrying roller 5 is also connected to the carrier 11, the latter represents a part of the chassis 4 in this embodiment.

Figure 6B:
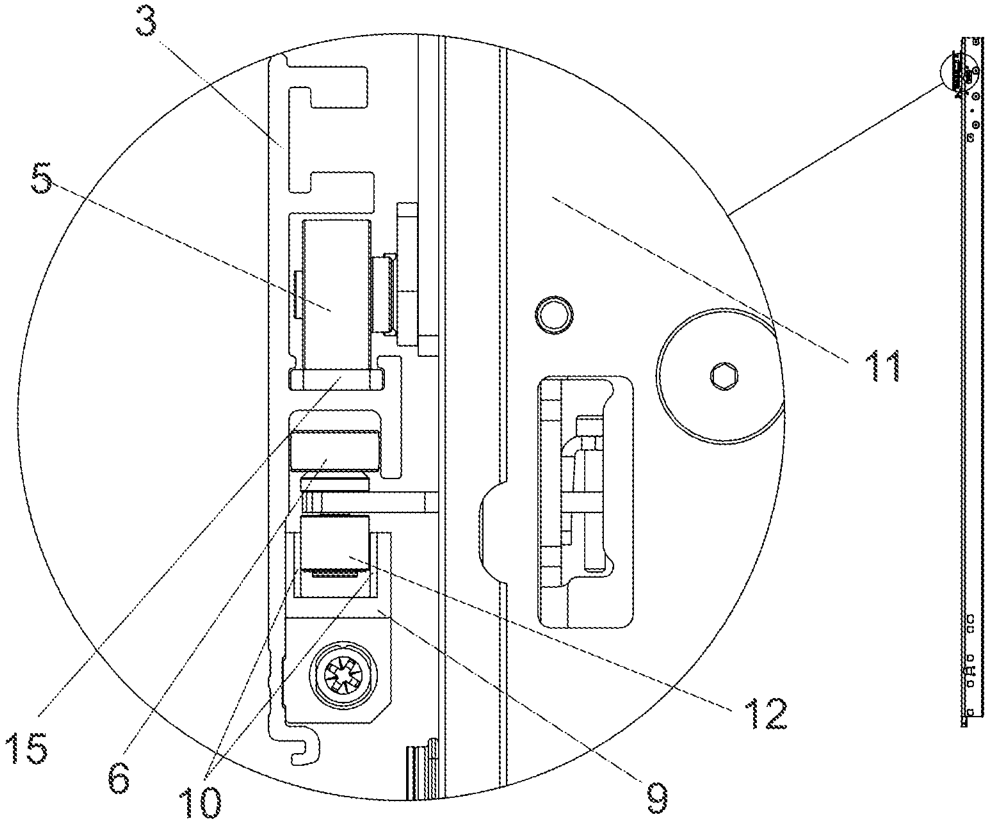
FIG. 6*b* is a side view of the embodiment according to FIGS. 4*a*, 4*b* of the guide device with carrier in coupled position.

FIG. 6*b* shows the guide device 1 with carrier 11 in the coupled position in a side view, which in the installed position corresponds to the front view of the piece of furniture 1.

Although FIG. 6*b*, in comparison with FIG. 5*b*, depicts the coupled state of the support device 7, in this perspective there is no discernible difference.

In the guide rail 3 the carrying roller 5 is mounted movably on a support 15. The carrying roller 5 is connected to the carrier 11, on which the furniture part 2 can be rotatably mounted. The supporting roller 6 and the rolling bodies 12 are arranged on the same carriage 18, which is also connected to the carrier 11.

Figure 7:
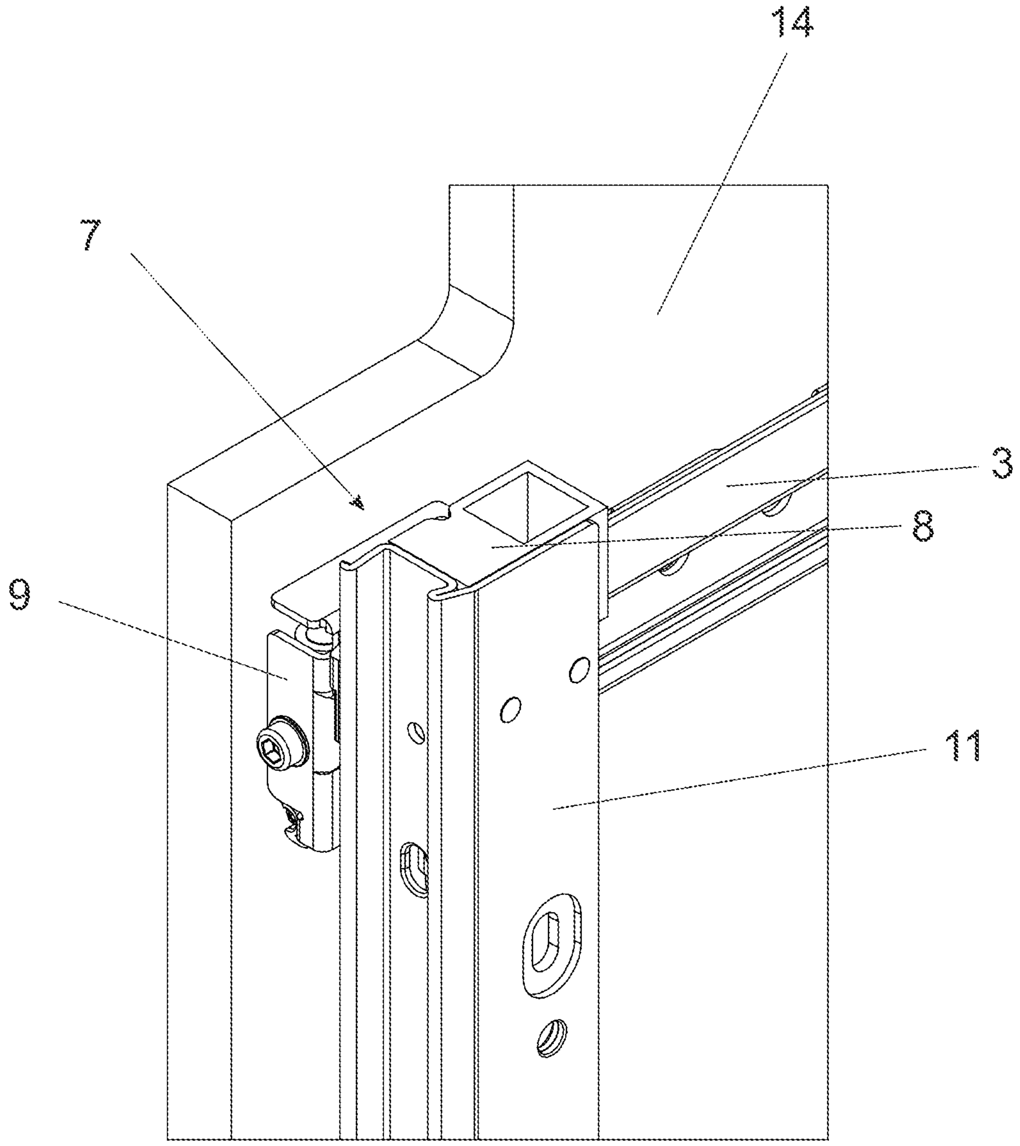
FIG. 7 is a perspective view of a second embodiment of the guide device in a coupled state.

FIG. 7 shows a second embodiment of a support device 7 according to the invention in the coupled state. The guide rail 3 is installed on the side wall 14 of the furniture carcass 21. The first part 8, movement-coupled to the chassis 4, of the support device 7 is arranged on the carrier 11. The part 9, which is arranged fixed, of the support device 7 is arranged on the guide rail 3.

The chassis 4 or the at least one supporting roller 6 and the carrying roller 5 are, however, concealed by the carrier 11 in this figure. For a use according to FIGS. 1*a*, 1*b*, 2*a* and 2*b*, another attachment with a receiver for the guide carriage 26 of the transverse rail 25 can be arranged on the first part 8 of the support device 7. In order to guarantee a transfer from the transverse rail 25 to this attachment, a recess is provided on the side wall 14.

Figure 8:
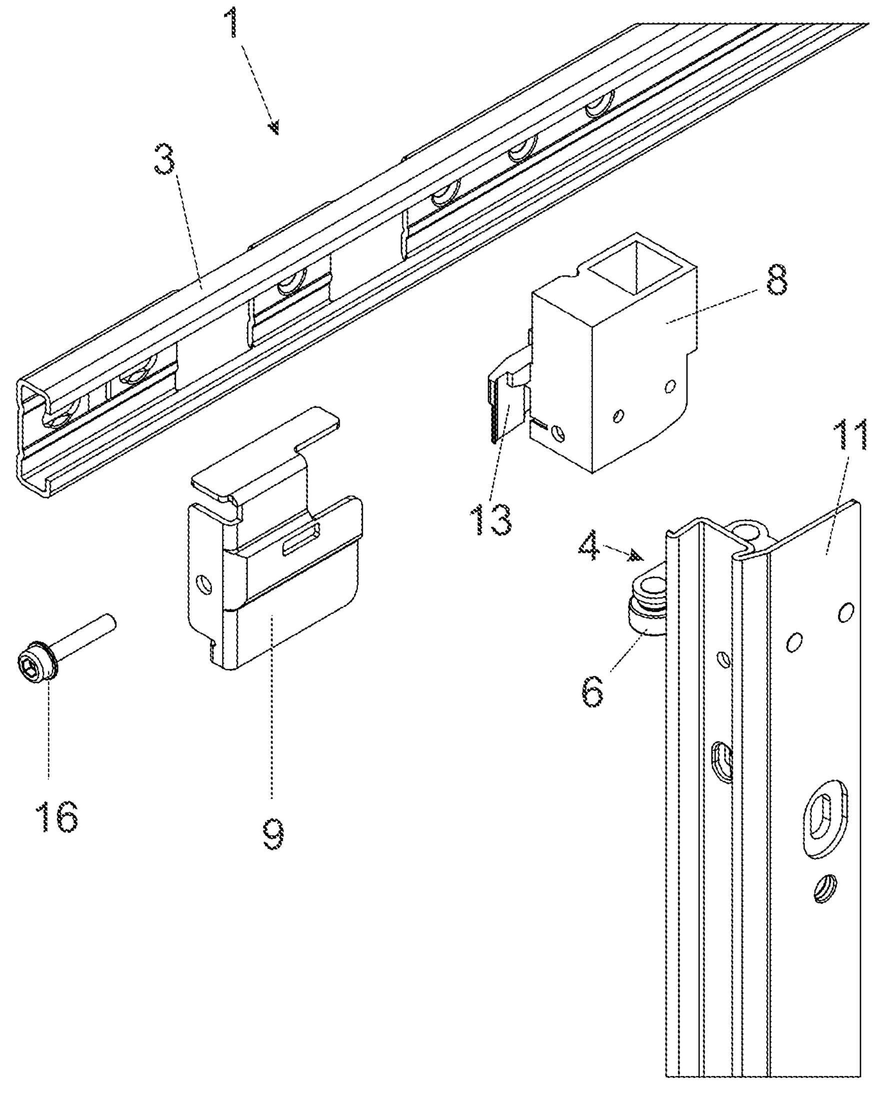
FIG. 8 is an exploded representation of the embodiment from FIG. 7.

FIG. 8 shows the embodiment from FIG. 7 in an exploded representation. The guide device 1 consists of a guide rail 3, a carrier 11 with chassis 4 arranged thereon, which comprises at least one carrying roller 5 and at least one supporting roller 6. Only one supporting roller 6 is depicted in this figure. The second supporting roller 6 and the carrying roller 5 are concealed by the carrier 11.

The support device 7 consists of two parts, wherein the first part 8 of the support device 7 can be arranged movement-coupled to the chassis 4 and the second part 9 of the support device 7 can be arranged fixed.

The first part 8, which can be movement-coupled to the chassis 4, of the support device 7 has a sliding body 13 which acts as a guide during the initiation of and/or during the pressure-relieving process. The second part 9, which can be arranged fixed, of the support device 7 can be arranged on the guide rail 3 and be connected to the latter with a screw 16. The corresponding counterpart with a thread for receiving the screw 16 is concealed by the second part 9 of the support device 7 in this figure.

Figure 9:
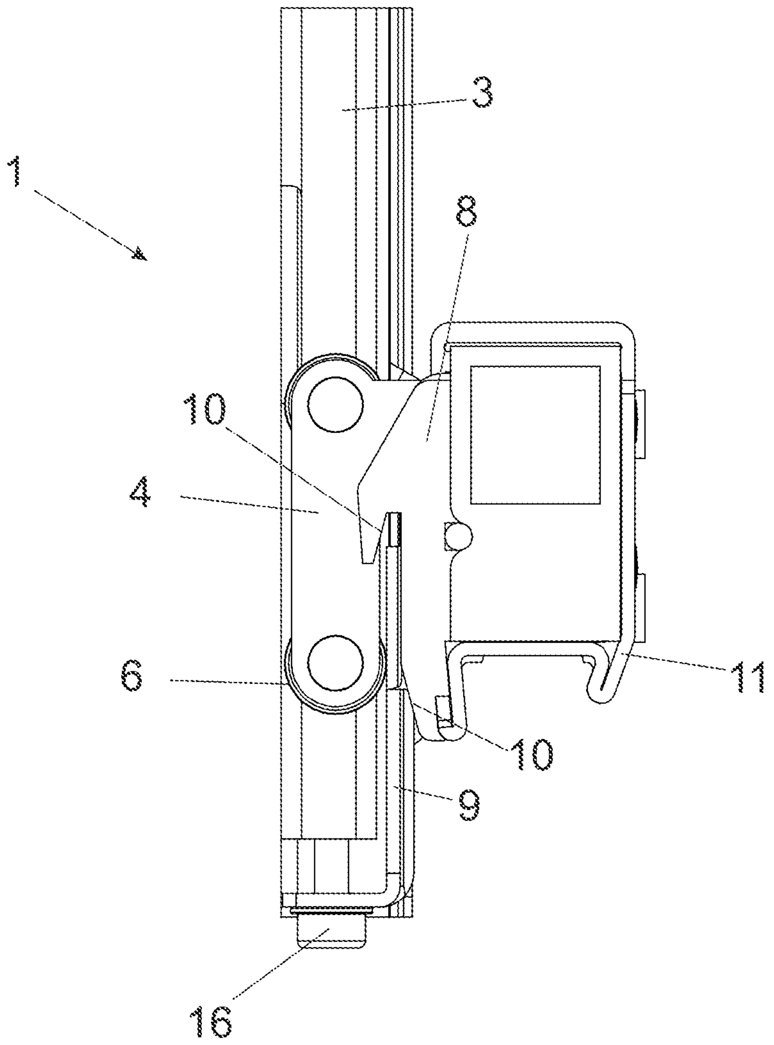
FIG. 9 shows a horizontal section of the embodiment from FIG. 7 in a decoupled state.

FIG. 9 shows a horizontal section of the embodiment from FIG. 7 in the decoupled state. Two supporting rollers 6 are arranged movable in the guide rail 3. Through the chassis 4 these are connected to the carrying roller 5 concealed by the chassis 4.

The first ramp 10, seen from the depicted end of the guide rail 3, of the first part 8, arranged movement-coupled to the chassis 4, of the support device 7 serves to guide the movement-coupled part 8 of the support device 7 during the coupling process. The second ramp 10 serves to bring the first part 8 of the support device 7 into the correct end position and thereby to guarantee a permanent relieving of the pressure on the supporting rollers 6 in the end position.

Figure 10:
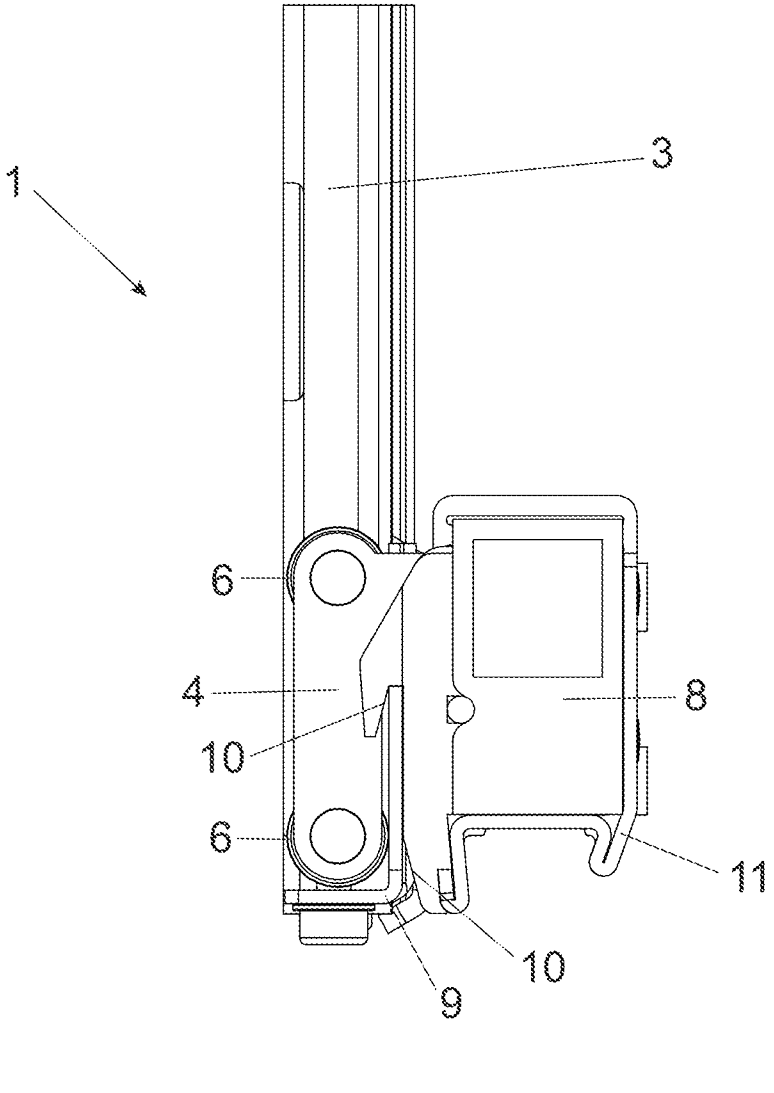
FIG. 10 shows a horizontal section of the embodiment from FIG. 7 in a coupled state.

FIG. 10 shows the same horizontal section as FIG. 9 in the coupled state. The first part 8, movement-coupled to the chassis 4, of the support device 7 is located in the end position and is connected flush to the second part 9, which can be arranged fixed, of the support device 7.

In this position, in the case of a use according to FIGS. 1*a*, 1*b*, 2*a*, and 2*b* the furniture part 2 can be brought from the parallel position into the coplanar position in order to conceal the interior 22 of the piece of furniture 20. In the process there is a change in the loading of the guide device 1 and thus the support device 7. Through this change in loading the two parts 8, 9 of the support device 1 become wedged together, whereby the relieving of the pressure on the supporting rollers 6 is additionally enhanced and the chassis 4 is fixed in the end position.

FIGS. 11*a*-11*e* show various views of a mounting device 19 for the rotatable mounting of the rolling body 12 and/or the supporting roller 6. The mounting device 19 comprises a, preferably plate-shaped, base part 19*a* and a bearing pin 29 for the mounting of the rolling body 12 and/or the supporting roller 6. Through the mounting device 19 shown the stability of the bearing pin 29, the rolling body 12 and the supporting roller 6 against tilting in relation to the base part 19*a* can in particular be increased.

Figure 11A:
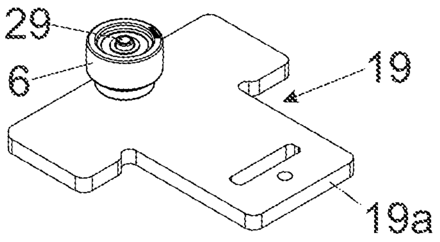
FIGS. 11*a*-11*e* shows an embodiment of a mounting device for the rotatable mounting of the rolling body and/or the supporting roller, FIGS. 12*a, b* shows a further embodiment of a support device which comprises two pins which are mounted in a front end section of a guide rail, wherein partial
Figure 11B:
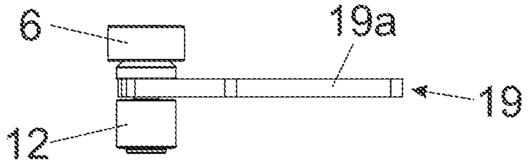
Figure 11C:
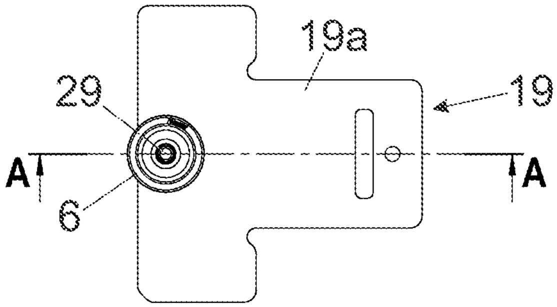
Figure 11D:
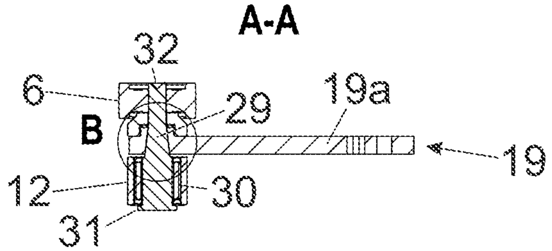
Figure 11E:
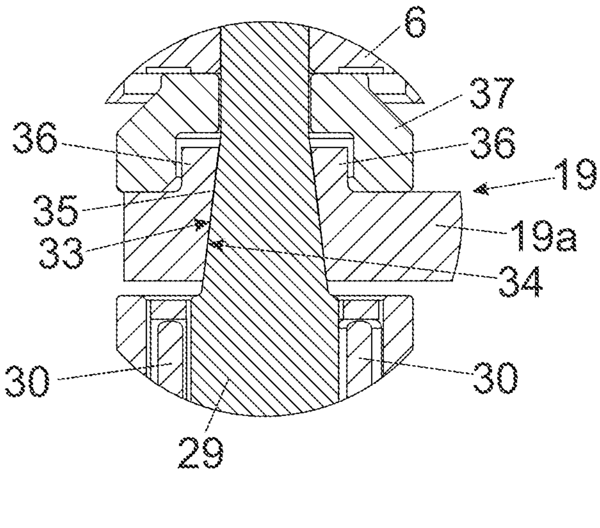

FIG. 11*a* shows a perspective view of the mounting device 19, FIG. 11*b* shows the mounting device 19 in a side view, FIG. 11*c* shows a top view of the mounting device 19, FIG. 11*d* shows a sectional view along the plane A-A according to FIG. 11*c*, and FIG. 11*e* shows the region encircled in FIG. 11*d* in an enlarged view.

As emerges from the sectional representation according to FIG. 11*d*, the rolling body 12 and the supporting roller 6 are spaced apart from each other in a vertical direction. The compact needle roller bearing 30 for the rotatable mounting of the rolling body 12 can be seen.

The bearing pin 29 has two end regions 31, 32 spaced apart from each other, wherein the rolling body 12 is arranged on the first end region 31 and the supporting roller 6 is arranged on the second end region 32 of the bearing pin 29. The first end region 31 of the bearing pin 29 is designed widened, with the result that the rolling body 12 is held in position rotatably. On the other hand, the second end region 32 of the bearing pin 19 can be formed by orbital riveting, with the result that the supporting roller 6 is arranged rotatably and undetachably on the bearing pin 29.

FIG. 11*e* shows the region encircled in FIG. 11*d* in an enlarged view. It can be provided that

- the base part 19*a* has at least one extrusion 36, in which the bearing pin 29 is arranged, and/or
- the base part 19*a* has at least one through-hole 33 which is formed conical in a cross section, wherein the bearing pin 29 has a corresponding mating shape 34, and/or
- the bearing pin 29 and the base part 19*a* are connected to each other at a connection point 35 and are pressed together at the connection point 35.

The two end regions 31, 32 of the bearing pin 29 can protrude in different directions from the base part 19*a* and/or at least one spacer 37 is provided which spaces the at least one supporting roller 6 apart from the base part 19*a*.

Through the extrusion 36 (i.e. through a collar drawn out from the base part 19*a*) the contact area between the base part 19*a* and the bearing pin 29 can be enlarged. An additional strength between the base part 19*a* and the bearing pin 29 is brought about through the conical press fit between the base part 19*a* and the bearing pin 29. It is preferably provided that the base part 19*a* and the bearing pin 29 are pressed together at the connection point 35, whereby the base part 19*a* and the bearing pin 29 can be connected to each other in a friction-locking and positive-locking manner.

The spacer 37 is arranged between the base part 19*a* and the supporting roller 6, wherein the spacer 37 surrounds the through-hole 33 at least in regions. The spacer 37 rests against the base part 19*a* and in this way hinders a tilting movement of the supporting roller 6 relative to the base part 19*a*.

Figure 12A:
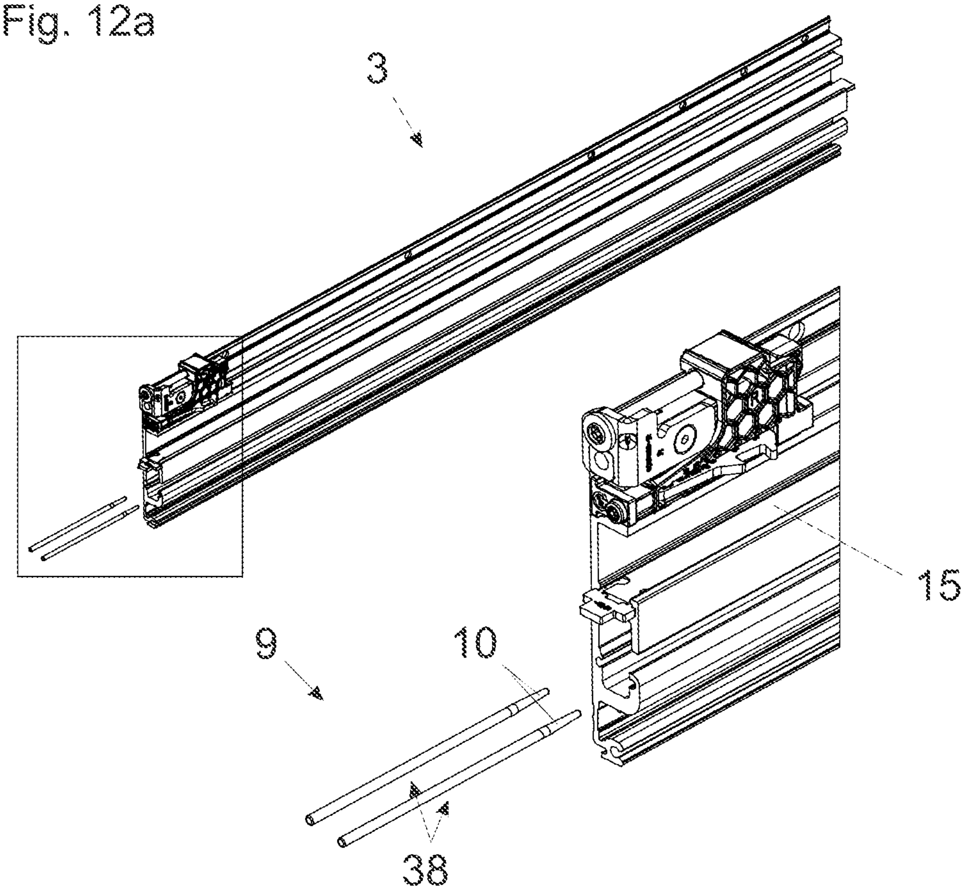
FIG. 12*a* shows a disassembled state and partial
Figure 12B:
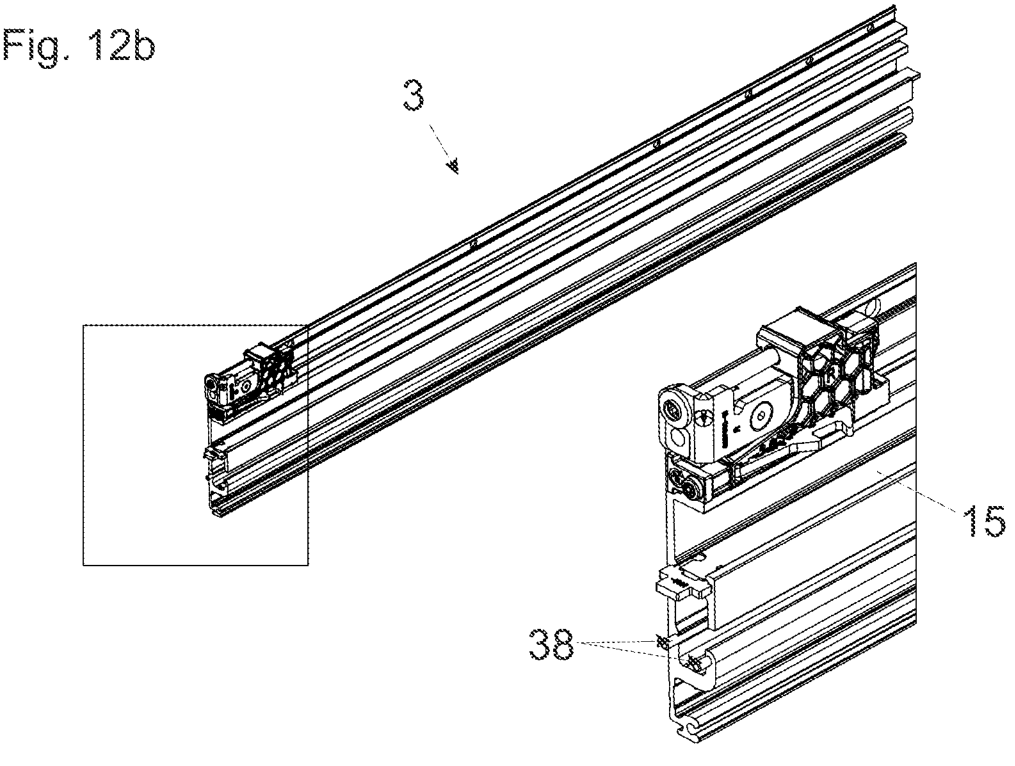
FIG. 12*b* shows an assembled state, in each case in a perspective view, and FIGS. 13*a, b* a cross-sectional view of the further embodiment with the two pins, wherein partial

FIGS. 12*a, b* and 13*a, b* show a further embodiment of a support device 7 which comprises two pins 38 which are mounted in a front end section of the guide rail 3.

The pins 38 are arranged substantially parallel to a longitudinal direction of the at least one guide rail 3.

The two pins 38 are spaced apart from each other in a transverse direction of the guide rail 3.

The pins 38 each have a ramp 10 in an end region. The ramp 10 can be formed in the shape of a frustoconical section.

The pins 38 are each arranged in a corresponding recess 39 of a profiled section 40, preferably U-shaped in a cross section, of the guide rail 3.

The pins 38 substantially consist of steel.

Figure 13A:
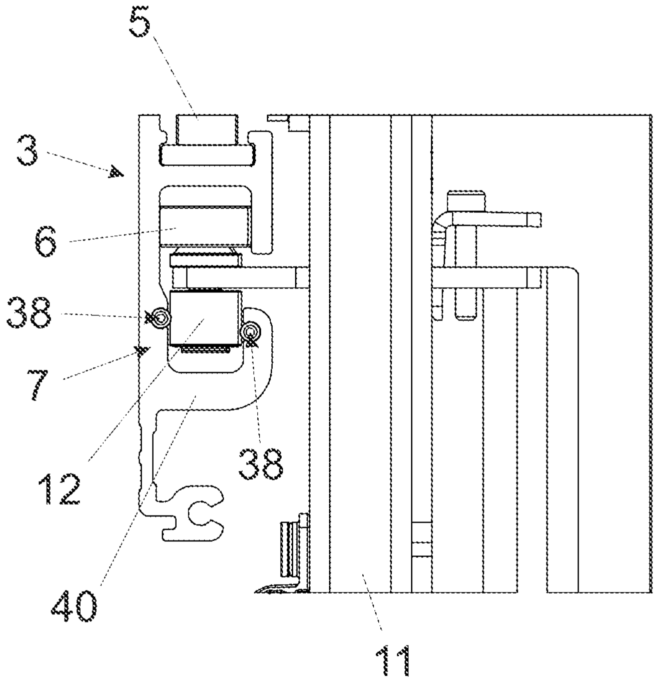
FIG. 13*a* shows a state in which a rolling body is supported on the two pins in an end position, and partial
Figure 13B:
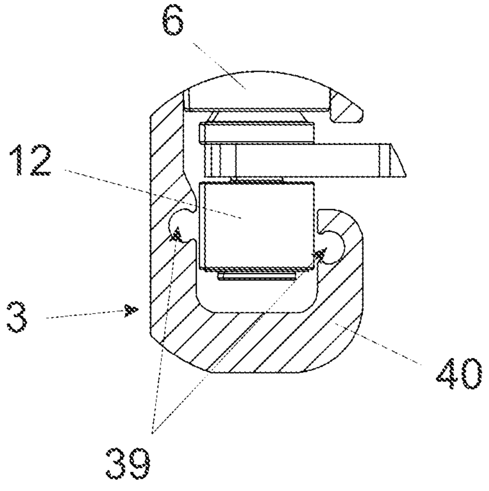
FIG. 13*b* shows a state in which that is not the case in a position separate from the end position.

FIG. 13*a* shows a state in which the rolling body 12 is supported on the two pins 38 in an end position, and FIG. 13*b* shows a state in which that is not the case in a position separate from the end position.

In the supported state, the pressure on the supporting roller 6 is relieved. In the unsupported state, the rolling body 12 is not in contact with the guide rail 3. The lateral support in this case is effected by the supporting roller 6.

The invention claimed is:

1. A guide device for guiding a furniture part, comprising:
at least one guide rails; and
a chassis which can be connected to the furniture part, the chassis being connected to the at least one guide rail such that the chassis can travel on the at least one guide rail, wherein the chassis includes at least one carrying roller mounted about a first axis of rotation for supporting the weight of the furniture part, the at least one carrying roller being arranged to move on a first surface in the at least one guide rail, at least one supporting roller for laterally guiding the furniture part, wherein the at least one supporting roller is mounted rotatably about a second axis of rotation aligned transverse to the first axis of rotation, the at least one supporting roller being arranged to move on a second surface in the at least one guide rail, and at least one support device which is separate from the at least one supporting roller, the at least one support device being connected to the at least one guide rail and being configured to relieve a pressure of a transverse force acting substantially parallel to the first axis of rotation on the at least one supporting roller when the chassis is in at least one end position at an end of the at least one guide rail, wherein the chassis includes at least one carrier aligned substantially parallel to the second axis of rotation, and the furniture part can be connected to the at least one carrier of the chassis, or the at least one guide rail includes at least two guide rails which are arranged substantially transverse to each other.

2. The guide device according to claim 1, wherein the at least one support device has a first part and a second part, the first part being movable relative to the second part, and wherein the first part and the second part are coupled to each other in a first position in order to relieve the pressure of the transverse force on the at least one supporting roller, and are decoupled from each other at least in a second position.

3. The guide device according to claim 2, wherein the first part of the at least one support device is connected to the chassis so as to move together with the chassis, or the second part of the at least one support device is fixed to the at least one guide rail.

4. The guide device according to claim 1, wherein the at least one support device has at least one ramp.

5. The guide device according to claim 4, wherein the at least one ramp is aligned substantially parallel to the second axis of rotation of the at least one supporting roller, or the at least one ramp is aligned at an angle to a longitudinal direction of the at least one guide rail.

6. The guide device according to claim 1, wherein the at least one support device has at least one rolling body.

7. The guide device according to claim 6, wherein the at least one support device has a first part and a second part, the first part being movable relative to the second part, and wherein the first part and the second part are coupled to each other in a first position in order to relieve the pressure of the transverse force on the at least one supporting roller, and are decoupled from each other at least in a second position, wherein the first part of the at least one support device includes the at least one rolling body, and the second part of the at least one support device has a U-shaped profile which can be detachably coupled to the at least one rolling body of the first part of the at least one support device.

8. The guide device according to claim 6, further comprising at least one mounting device on which the at least one rolling body is rotatably mounted, wherein the mounting device has a base part and a bearing pin arranged thereon.

9. The guide device according to claim 8, wherein the base part has at least one extrusion, in which the bearing pin is arranged, or the base part has at least one through-hole which is formed conical in a cross section, and the bearing pin has a corresponding mating shape, or the bearing pin and the base part are connected to each other at a connection point and are pressed together at the connection point.

10. The guide device according to claim 8, wherein the bearing pin has a first end region and a second end region, and wherein the at least one rolling body is rotatably mounted on aon the first end region and the at least one supporting roller is rotatably mounted the second end region.

11. The guide device according to claim 10, wherein the first and second end regions protrude in different directions from the base part, or a spacer is provided which spaces the at least one supporting roller apart from the base part.

12. The guide device according to claim 1, wherein the at least one support device has at least one sliding body.

13. The guide device according to claim 1, wherein the at least one support device is configured to prevent contact between the at least one supporting roller and the at least one guide rail when the chassis is in the at least one end position.

14. The guide device according to claim 1, wherein the at least one guide rail includes regions which consist of aluminum, or a lateral surface of the at least one supporting roller consists of plastic, or the at least one support device has at least one steel part which is fixed to the at least one guide rail.

15. The guide device according to claim 1, wherein the at least one support device has at least one pin.

16. A piece of furniture comprising:

a furniture part;

a furniture carcass; and the guide device according to claim 1, wherein the at least one guide rail is mounted on the furniture carcass, and the chassis is connected to the furniture part.

17. The piece of furniture according to claim 16, wherein the piece of furniture has at least one interior which can be at least partially covered by the at least one furniture part, and in which kitchen furniture or kitchen appliances can be arranged, or the piece of furniture has at least one cavity extending in a depth direction of the piece of furniture for at least partially receiving the at least one furniture part.

18. A method for guiding a furniture part relative to a furniture carcass by the guide device according to claim 1, comprising:

supporting the weight of the furniture part by the at least one carrying roller of the chassis;

laterally guiding the furniture part by the at least one supporting roller during a movement of the furniture part along the at least one guide rail; and relieving a pressure of a transverse force acting substantially parallel to the first axis of rotation on the at least one supporting roller is relieved by the at least one support device when the chassis is in the at least one end position.

19. The method according to claim 18, wherein the at least one support device prevents contact between the at least one supporting roller and the at least one guide rail when the chassis is in the at least one end position.

20. The method according to claim 18, wherein the furniture part is a sliding door or a folding sliding door.

21. The guide device according to claim 1, wherein the furniture part is a sliding door or folding sliding door, and
- the chassis includes the at least one carrier, and the furniture part can be connected to the at least one carrier of the chassis via at least one hinge.

22. A guide device for guiding a furniture part, comprising:
- at least one guide rail; and
- a chassis which can be connected to the furniture part, the chassis being connected to the at least one guide rail such that the chassis can travel on the at least one guide rail,
- wherein the chassis includes
  - at least one carrying roller mounted about a first axis of rotation for supporting the weight of the furniture part, the at least one carrying roller being arranged to move on a first surface in the at least one guide rail,
  - at least one supporting roller for laterally guiding the furniture part, wherein the at least one supporting roller is mounted rotatably about a second axis of rotation aligned transverse to the first axis of rotation, the at least one supporting roller being arranged to move on a second surface in the at least one guide rail, and
  - at least one support device which is separate from the at least one supporting roller, the at least one support device being connected to the at least one guide rail and being configured to relieve a pressure of a transverse force acting substantially parallel to the first axis of rotation on the at least one supporting roller when the chassis is in at least one end position at an end of the at least one guide rail,
- wherein the at least one support device has at least one rolling body.

23. The guide device according to claim 22, wherein the at least one rolling body:
- is mounted rotatably about a third axis of rotation aligned parallel to the second axis of rotation of the at least one supporting roller; or
- is mounted on the chassis via at least one needle roller bearing; or
- includes regions which consist of steel.

24. A guide device for guiding a furniture part, comprising:
- at least one guide rail; and
- a chassis which can be connected to the furniture part, the chassis being connected to the at least one guide rail such that the chassis can travel on the at least one guide rail,
- wherein the chassis includes
  - at least one carrying roller mounted about a first axis of rotation for supporting the weight of the furniture part, the at least one carrying roller being arranged to move on a first surface in the at least one guide rail,
  - at least one supporting roller for laterally guiding the furniture part, wherein the at least one supporting roller is mounted rotatably about a second axis of rotation aligned transverse to the first axis of rotation, the at least one supporting roller being arranged to move on a second surface in the at least one guide rail, and
  - at least one support device which is separate from the at least one supporting roller, the at least one support device being connected to the at least one guide rail and being configured to relieve a pressure of a transverse force acting substantially parallel to the first axis of rotation on the at least one supporting roller when the chassis is in at least one end position at an end of the at least one guide rail,
- wherein the at least one support device has at least one pin.

25. The guide device according to claim 24, wherein:
- the at least one pin is arranged substantially parallel to a longitudinal direction of the at least one guide rail; or
- the at least one pin comprises at least two pins, wherein the at least two pins are spaced apart from each other; or
- the at least one pin has a ramp in an end region; or
- the at least one pin is arranged in a corresponding recess of a profiled section of the at least one guide rail; or
- the at least one pin substantially consists of steel; or
- the at least one pin is arranged in an end region of the at least one guide rail.

26. The guide device according to claim 25, wherein the at least one pin comprises the at least two pins, and the at least two pins are spaced apart from each other in a transverse direction of the at least one guide rail.

* * * * *